(12) United States Patent
Nagata et al.

(10) Patent No.: US 8,490,665 B2
(45) Date of Patent: Jul. 23, 2013

(54) VEHICLE WHEEL

(75) Inventors: Shinya Nagata, Saitama (JP); Masashi Kitagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 12/876,577

(22) Filed: Sep. 7, 2010

(65) Prior Publication Data

US 2011/0057505 A1 Mar. 10, 2011

(30) Foreign Application Priority Data

Sep. 8, 2009 (JP) ................................. 2009-206698

(51) Int. Cl.
*B60C 19/00* (2006.01)

(52) U.S. Cl.
USPC ..................................................... 152/381.6

(58) Field of Classification Search
USPC .................. 152/381.5, 381.6, 400, 516, 518, 152/519, 520
See application file for complete search history.

(56) References Cited

U.S. PATENT DOCUMENTS

| | | | |
|---|---|---|---|
| 5,538,058 A * | 7/1996 | Aloy ........................... | 152/381.5 |
| 7,690,410 B2 * | 4/2010 | Kamiyama et al. ......... | 152/381.5 |
| 7,896,043 B2 * | 3/2011 | Kashiwai et al. ........... | 152/381.6 |
| 8,181,685 B2 * | 5/2012 | Kamiyama et al. ......... | 152/381.5 |
| 2008/0179939 A1 * | 7/2008 | Kusaka et al. ............. | 301/95.104 |
| 2009/0072611 A1 | 3/2009 | Kashiwai et al. | |

FOREIGN PATENT DOCUMENTS

JP 2009-074595 A 4/2009

* cited by examiner

*Primary Examiner* — Jason Bellinger
*Assistant Examiner* — Jean Charleston
(74) *Attorney, Agent, or Firm* — Carrier Blackman & Associates, P.C.; Joseph P. Carrier; Jeffrey T. Gedeon

(57) ABSTRACT

There is provided a vehicle wheel that can suppress any detachment of a sub air chamber from a well portion when a fixing member between the sub air chamber and the well portion becomes defective by any possibility. A vehicle wheel comprises a sub-air-chamber member which reduces any air column resonance of a tire and which is disposed on an outer circumference surface of a well portion of a rim. The sub-air-chamber member is fixed on the well-portion outer circumference surface, the sub-air-chamber member is covered by a cover made of a rubber from an external side, and the cover is fixed on an outer circumference surface of the rim at both sides of the sub-air-chamber member in a rim width direction.

6 Claims, 9 Drawing Sheets

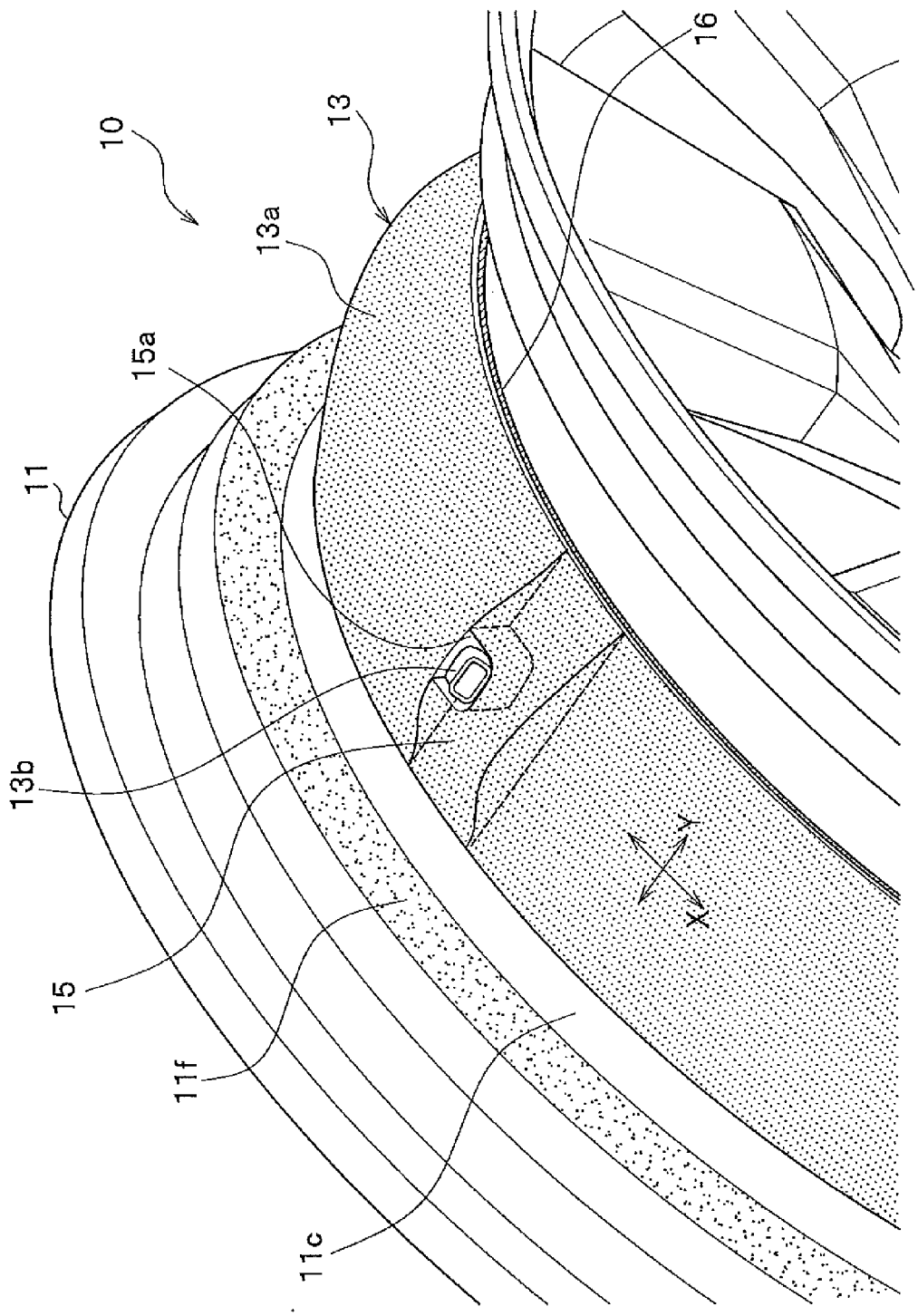

VEHICLE WHEEL

CROSS REFERENCE TO RELATED APPLICATIONS

This application claims the foreign priority benefit under Title 35, United States Code, §119(a)-(d) of Japanese Patent Application No. 2009-206698, filed on Sep. 8, 2009 in the Japan Patent Office, the disclosure of which is herein incorporated by reference in its entirety.

BACKGROUND OF THE INVENTION

1. Field of the Invention

The present invention relates to a vehicle wheel including a sub air chamber that reduces an air column resonance of a tire.

2. Description of the Related Art

In general, it is known that an air column resonance (cavity resonance) generated in a tire air chamber is a factor of a vehicular road noise. Such air column resonance is a phenomenon in which an air column in the air chamber resonates in response to vibrations transmitted from a road surface to a tread portion of a tire while a vehicle is traveling.

Conventionally, there is known a vehicle wheel having a sub air chamber which reduces an air column resonance of a tire and which is fitted into and attached to the well portion of a rim (see, for example, JP 2009-074595A). According to such a vehicle wheel, an edge of the sub air chamber extending in a tabular shape has a spring elasticity, and when the extending leading end of the edge is fitted into a groove formed in the well portion, the sub air chamber is caught by the well portion because of repulsive force in a direction in which the edge extends.

According to the conventional vehicle wheel (see, for example, JP 2009-074595A), however, although the sub air chamber is surely fixed to the well portion because of the spring elasticity of the edge, no fail safe for a case in which the sub air chamber is detached by any possibility is provided.

Therefore, there is a demand for a vehicle wheel that can suppress any detachment of the sub air chamber from the well portion when a fixing member between the sub air chamber and the well portion becomes defective by any possibility.

SUMMARY OF THE INVENTION

The present invention can provide a vehicle wheel that can suppress an detachment of a sub air chamber from a well portion when a fixing member between the sub air chamber and the well portion becomes defective by any possibility.

A first aspect of the present invention provides a vehicle wheel comprising:

a rim including a well portion;

a sub-air-chamber member that reduces air column resonance of a tire and disposed on an outer circumference surface of the well portion, wherein the sub-air-chamber member is fixed on the well-portion outer circumference surface; and a cover, made of a rubber covering the sub-air-chamber member from an external side, is fixed on an outer circumference surface of the rim at both sides of the sub-air-chamber member in a rim width direction.

According to the vehicle wheel, even if a fixing member between the sub-air-chamber member and the well-portion outer circumference surface becomes defective, the cover that covers the sub-air-chamber member from the external side can prevent the sub-air-chamber member from being detached from the well-portion outer circumference surface.

Also, according to the vehicle wheel, because the cover suppresses any heat transfer from the tire air chamber to the rim, any temperature decrease of the tire air chamber is suppressed, and the temperature of the tread part of the tire is maintained at high. Accordingly, the vehicle wheel can reduce the rolling resistance of the tire, thereby improving the fuel economy.

Also, according to the vehicle wheel, because the cover protects the sub-air-chamber member, it is possible to prevent the sub-air-chamber member from being damaged at the time of tire removal and attachment work.

A second aspect of the present invention provides the vehicle wheel based on the first aspect, wherein the cover is formed of a heat-insulation rubber.

According to the vehicle wheel, the heat transfer from the tire air chamber to the rim can be further suppressed, so that an effect of improving the fuel economy originating from reduction of the rolling resistance of the tire is further enhanced.

A third aspect of the present invention provides the vehicle wheel based on the first aspect, wherein a rubber member is fixed on the well-portion outer circumference surface of the rim, and the sub-air-chamber member is fixed on the rubber member.

According to the vehicle wheel, even if the thermal expansion coefficient of the sub-air-chamber member and that of the rim differ from each other, the rubber member present therebetween can eliminate such difference in the thermal expansion coefficient, so that the sub-air-chamber member is surely fixed on the rim outer circumference surface.

A fourth aspect of the present invention provides the vehicle wheel based on the first aspect, wherein the well portion comprises a recess formed in the well-portion outer circumference surface to houses the sub-air-chamber member, and an upper part of the sub-air-chamber member is flush with the well-portion outer circumference surface adjacent to the recess.

According to the vehicle wheel, because the upper part of the sub-air-chamber member and the well-portion outer circumference surface adjacent to the recess form a successive plane (are flush with each other), attachment of the cover and fixing thereof are facilitated. Also, according to the vehicle wheel, the sub-air-chamber member has no protrusion to the external side of the wheel diameter direction on the well-portion outer circumference surface, it is possible to surely prevent the sub-air-chamber member from being damaged at the time of tire detachment work.

A fifth aspect of the present invention provides the vehicle wheel based on the first aspect, wherein the sub-air-chamber member comprises a plurality of sub-air-chamber members that are arranged in a circumferential direction of the rim with a space between adjoining sub-air-chamber members and fixed to the well-portion outer circumference surface, each sub-air-chamber member has the same cross section defined by the rim width direction and a radial direction of the vehicle wheel across a whole length of the sub-air-chamber member in a circumferential direction of the vehicle wheel, the vehicle wheel further comprises a spacer, having the same cross section defined by the rim width direction and the radial direction of the vehicle wheel as the cross section of the sub-air-chamber member, and fixed on the well-portion outer circumference surface between adjoining sub-air-chamber members to make the cross sections of the sub-air-chamber member and the spacer continuous across a whole circumference of the vehicle wheel, each sub-air-chamber member and each spacer are covered by the cover from an external side, and the cover is fixed on the outer circumference surface of the rim at both sides of each sub-air-chamber member and at both sides of each spacer in the rim width direction.

According to the vehicle wheel, because a plurality of the sub-air-chamber members and a plurality of the spacers are successive without any space across the whole circumference of the wheel, attachment of the cover and fixing thereof are facilitated.

A sixth aspect of the present invention provides the vehicle wheel based on the fifth aspect, wherein the spacer has a recess formed on a face on the cover side, the cover has an opening at the recess, and a communicating member that protrudes from the sub-air-chamber member and causes an inside of the sub-air-chamber member to communicate with a tire air chamber is disposed in the recess.

According to the vehicle wheel, the spacer is efficiently used as a portion which retains the communicating member protruding from the sub-air-chamber member, and the plural sub-air-chamber members each having the protruding communicating member are made successive across the whole circumference of the wheel via respective spacers. Also, according to the vehicle wheel, because each communicating member is surrounded by the spacer, it is possible to prevent the communicating member from being damaged at the time of tire removal and attachment work.

According to the present invention, there is provided a vehicle wheel that can suppress any detachment of a sub air chamber from a well portion when a fixing member between the sub air chamber and the well portion becomes defective by any possibility.

BRIEF DESCRIPTION OF THE DRAWINGS

FIG. 5 is a partial enlarged perspective view showing a status of the sub-air-chamber member and the spacer which are fixed on the outer circumference surface of the well portion via a rubber material;

DETAILED DESCRIPTION OF THE PREFERRED EMBODIMENTS

A detailed explanation will be given of embodiments of the present invention with reference to the accompanying drawings.

<<Overall Structure of Vehicle Wheel>>

Figure 1A:
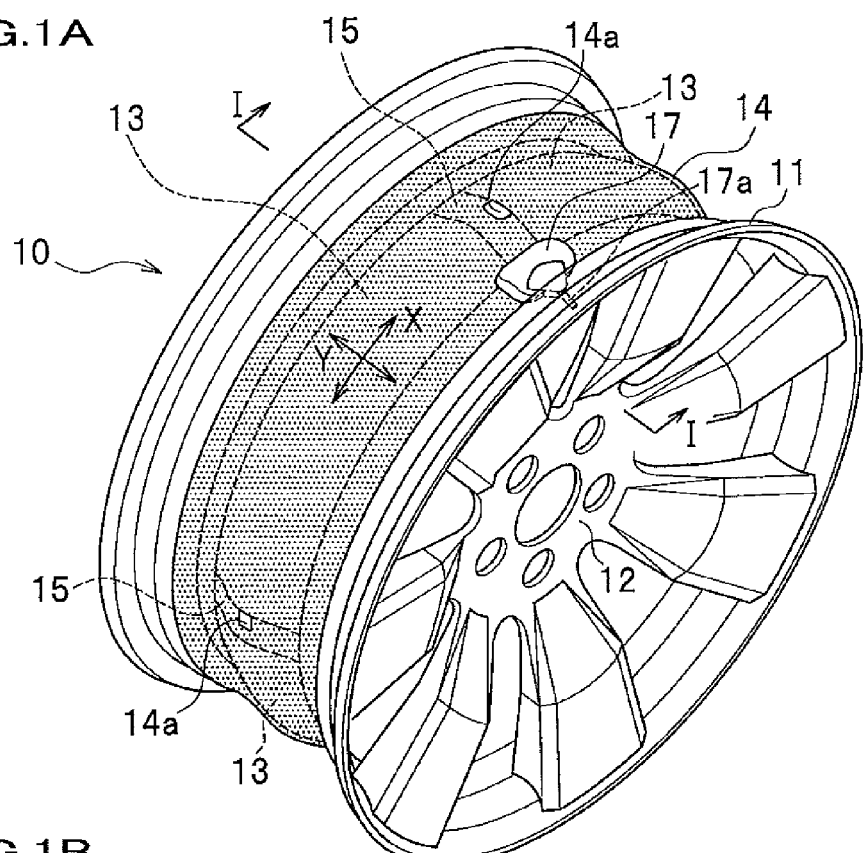
FIG. 1A is a perspective view of a vehicle wheel according to an embodiment where a sub-air-chamber member and a spacer are indicated by dotted lines.

As shown in FIG. 1A, a vehicle wheel 10 of this embodiment includes a rim 11, and a disc 12 for supporting the rim 11 and being mounted on a hub (not shown).

Figure 1B:
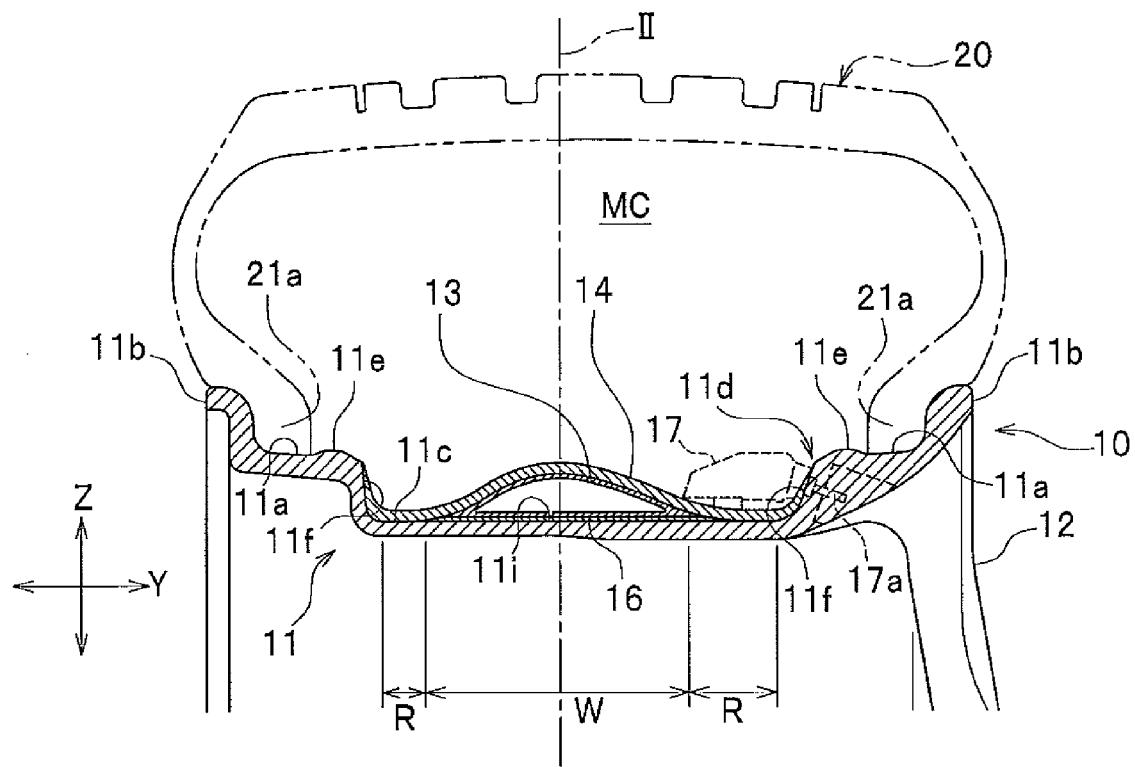
FIG. 1B is a partial cross-sectional view of a rim, taken along line I-I in FIG. 1A, where an air pressure detecting device is indicated by dotted lines and a tire having undergone rim fitting is indicated by dashed-two dotted line.

As shown in FIG. 1B, the rim 11 includes bead seating portions 11a, 11a formed at both ends of the rim 11 in a width direction Y (hereinafter, a rim width direction Y), rim flange portions 11b, 11b bent in an L shape from respective bead seating portions 11a, 11a, and a well portion 11c which is a portion between the bead seating portions 11a, 11a concaved inwardly of (lower side of FIG. 1B) a wheel diameter direction Z. Hump portions 11e, 11e upraising outwardly of the wheel diameter direction Z are formed at respective inner side ends of the bead seating portions 11a, 11a.

A bead part 21a of a tire 20 is attached to the bead seating portion 11a. Accordingly, a tire air chamber MC which is an annular airtightly closed space is formed between a rim outer circumference surface 11d of the rim 11 (hereinafter, referred to as "rim outer circumference surface 11d" in some cases) and the inner circumference surface of the tire 20.

The well portion 11c is provided for allowing the bead parts 21a, 21a of the tire 20 to fall thereonto when the tire 20 is fitted to the rim 11. Note that the well portion 11c of this embodiment is formed in a circular cylindrical shape having a substantially equal diameter across the rim width direction Y.

As shown in FIG. 1B, the disc 12 is formed so as to be continuous from a part of the well portion 11c at the outer side (right side of FIG. 1B) of the well portion 11c in the rim width direction Y and extending to the center of the wheel 10 in the wheel diameter direction Z.

Such rim 11 and disc 12 are produced from a light-weight and high-strength material, such as an aluminum alloy or a magnesium alloy. The kind of such a material is not limited to those, and may be steel, for example.

As shown in FIGS. 1A and 1B, the vehicle wheel 10 includes an air pressure detecting device 17 for the tire 20. The air pressure detecting device 17 is coupled with a tire valve 17a for inflating the tire air chamber MC, and the tire valve 17a is fitted into an attachment hole 11g (see FIG. 6) via a grommet (not shown) and is fixed thereto. Note that the air pressure detecting device 17 includes a pressure sensor, a temperature sensor, a battery, a CPU, a transmission/reception antenna, etc. (all not shown) all of which are built in the air pressure detecting device 17.

The vehicle wheel 10 of this embodiment further includes, as shown in FIGS. 1A and 1B, sub-air-chamber members 13, spacers 15, and a cover 14.

<<Structure of Sub-Air-Chamber Member>>

The sub-air-chamber member 13 is configured to function as a Helmholtz resonator to reduce any air column resonance (cavernous resonance) in the tire air chamber MC.

Figure 2:
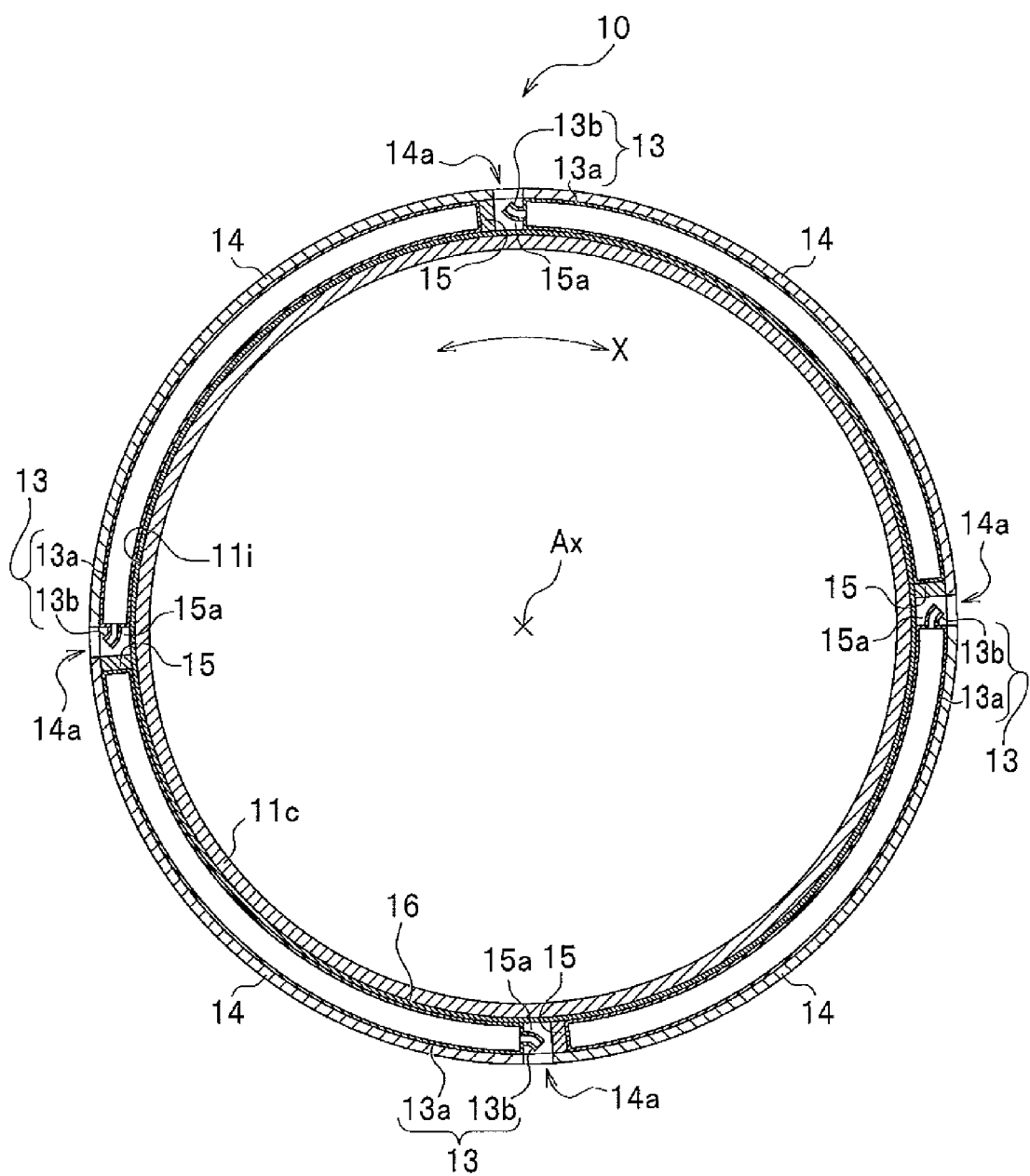
FIG. 2 is a cross-sectional view of the sub-air-chamber member disposed on an outer circumference surface of a well portion, the spacer and a covering member, and corresponds to a rim cross section II in FIG. 1B orthogonal to a wheel rotational axis.

As shown in FIG. 2, a plurality of sub-air-chamber members 13 are disposed so as to be lined in a wheel circumferential direction X with predetermined intervals on an outer circumference surface 11i of the well portion 11c (hereinafter referred to as, well-portion outer circumference surface 11i). As shown in FIG. 2, the vehicle wheel 10 includes a rubber member 16 intervening between the well portion 11c and the sub-air-chamber members 13. The rubber member 16 will be described more detail later.

As shown in FIG. 2, four sub-air-chamber members 13 are disposed in the wheel circumferential direction X at equal intervals. That is, two pairs of sub-air-chamber members 13, 13 facing across a wheel rotational axis Ax are disposed.

Figure 3A:
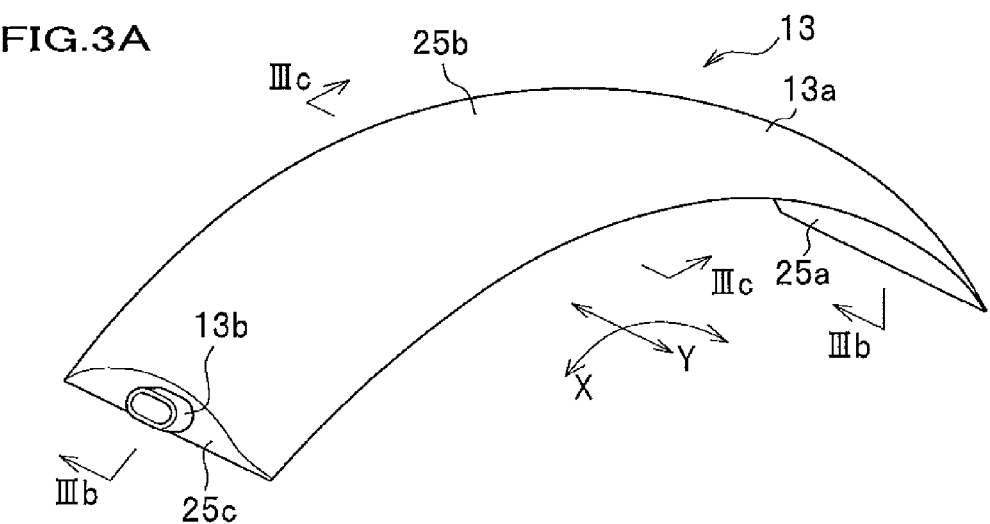
FIG. 3A is a perspective view of the sub-air-chamber member which is a part of the vehicle wheel of the embodiment.

The sub-air-chamber member 13 includes, as shown in FIG. 3A, a main body 13a and a communicating member 13b.

As shown in FIGS. 2 and 3A, the main body 13a is curved along the wheel circumferential direction X, and the curvature factor thereof is set to be substantially equal to the curvature factor of the well-portion outer circumference surface 11i (see FIG. 2) in the wheel circumferential direction X, and desirably, set to be substantially equal to the curvature factor of the rubber member 16 to be described later (see FIG. 2) pasted on the well-portion outer circumference surface 11i.

Figure 3B:
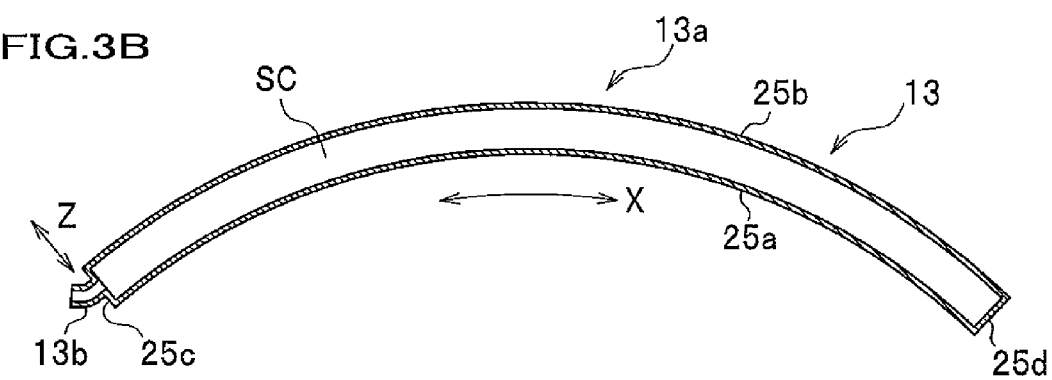
FIG. 3B is a cross-sectional view, taken along a line IIIb-IIIb in FIG. 3A.
Figure 3C:
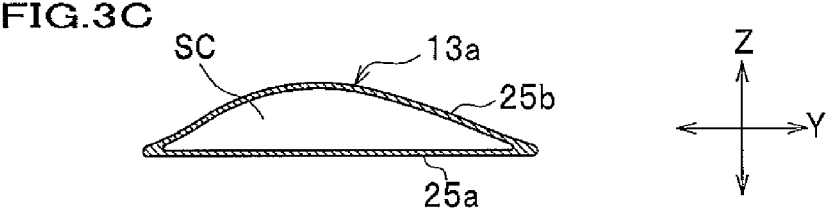
FIG. 3C is a cross-sectional view, taken along a line IIIc-IIIc in FIG. 3A, of the sub-air-chamber member.

As shown in FIGS. 3A to 3C, the main body 13a includes an upper plate 25b, a bottom plate 25a, and, a front plate 25c and a rear plate 25d provided at respective ends in the wheel circumferential direction X.

As shown in FIG. 3C, the bottom plate 25a is flat in the rim width direction Y, and the upper plate 25b is curved so as to be convex outwardly (upper side of the paper face of FIG. 3C) of the wheel diameter direction Z. The main body 13a curved and having a raising middle portion is so formed that the inclinations gradually become low toward both ends in the rim width direction Y and both ends become thin. That is, as shown in FIG. 1B, the main body 13a in this embodiment has a flat shape on the well portion 11c.

As shown in FIG. 1B, it is desirable that a width W of the main body 13a in the rim width direction Y should be set within a range that ensures, at both sides of the well portion 11c in the rim width direction Y, margins R onto which at least respective bead parts 21a, 21a of the tire 20 are fallen.

As shown in FIGS. 3B and 3C, a sub air chamber SC is formed inside the main body 13a.

It is desirable that the volume of the sub air chamber SC is approximately from 50 to 250 cc, and that around 100 cc is most desirable. As the volume of the sub air chamber SC is set to be within such a range, the vehicle wheel 10 (see FIG. 1A) can be light-weighted while the sub-air-chamber member 13 can achieve a sufficient silencing effect.

Through a simulation test, the inventors of the present invention confirmed that, according to the sub-air-chamber member 13 of this embodiment, if four sub-air-chamber members 13 each having a sub-air-chamber SC with a volume of around 100 cc are disposed in the tire air chamber MC, an air column resonance of 220 Hz can be reduced by approximately 13 dB.

A length of the sub-air-chamber member 13 (see FIG. 2) in the wheel circumferential direction X can be set accordingly in consideration of adjustment of a weight of the vehicle wheel 10 and of easiness of fitting relative to the well portion 11c (see FIG. 2).

As shown in FIGS. 3A to 3C, the main body 13a is so formed that a cross section in the rim width direction Y, i.e., a whole cross section including a cross section of the sub air chamber SC becomes same across the whole length in the wheel circumferential direction X.

The communicating member 13b is a tubular member which causes the sub air chamber SC shown in FIG. 3B to communicate with the tire air chamber MC shown in FIG. 1B. As shown in FIG. 3B, the communicating member 13b is formed so as to protrude from the substantial center of the front plate 25c of the main body 13a in the lengthwise direction of the main body 13a. The communicating member 13b has a leading end which is opened upward (outwardly of the wheel diameter direction Z). The shape of such an opening of the communicating member 13b in this embodiment is an elliptical shape, but may be a circular shape or a polygonal shape.

It is desirable that the communicating member 13b should have an internal diameter equal to or larger than 5 mm in a case in which the cross section thereof is a circular shape. Also, it is desirable that the communicating member 13b with a cross section formed in a shape other than a circular shape should have a diameter equal to or larger than 5 mm with the cross-sectional area being converted in the same cross-sectional area of a circular shape.

The length of the communicating member 13b is set so as to satisfy a formula represented by the following formula (1) for obtaining a resonant frequency of a Helmholtz resonator.

$$f_O = C/2\pi \times \sqrt{(S/V(L+\alpha \times \sqrt{S}))} \qquad (1)$$

where:

$f_O$ (Hz) is a resonant frequency;

C (m/s) is an acoustic velocity inside the sub air chamber SC (=an acoustic velocity inside the tire air chamber MC);

V (m$^3$) is a volume of the sub air chamber SC;

L (m) is a length of the communicating member 13b;

S (m$^2$) is a cross-sectional area of the opening of the communicating member 13b; and $\alpha$ is a compensating coefficient.

Note that the resonant frequency $f_O$ is set to match the resonant frequency of the tire air chamber MC (see FIG. 1B). At this time, the plural sub-air-chamber members 13 disposed on the well-portion outer circumference surface 11i (see FIG. 2) may be set to have the same resonant frequency $f_O$ or to have different resonant frequencies $f_O$. More specifically, in the vehicle wheel 10 having four sub-air-chamber members 13, 13, 13, and 13 disposed on the well-portion outer circumference surface 11i shown in FIG. 2 at equal intervals, when two resonant frequencies ($f_1$ and $f_2$) are recognized as the resonant frequencies of the tire air chamber MC (see FIG. 1B), respective resonant frequencies $f_O$ of the four sub-air-chamber members 13, 13, 13, and 13 can be set to ($f_1+f_2$)/2. Moreover, a pair of the sub-air-chamber members 13, 13 disposed on the opposite sides across the wheel rotation axis Ax may have the resonant frequency $f_O$ set to $f_1$, and the other pair of the sub-air-chamber members 13, 13 may have the resonant frequency $f_O$ set to $f_2$. Furthermore, all of the sub-air-chamber members 13, 13, 13, and 13 may have the resonant frequency $f_O$ set to $f_1$ or $f_2$.

Figure 3D:
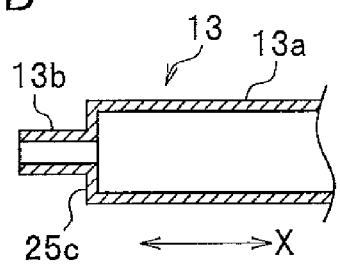
FIG. 3D is a partial cross-sectional view of a modified example of a communicating member shown in FIG. 3B.

The communicating member 13b of this embodiment is bent so as to be directed upward (outwardly of the wheel diameter direction Z), but as shown in FIG. 3D, may extend straightly toward the front (the wheel circumferential direction X) from the front plate 25c of the main body 13a. Also, it is not illustrated in the figure but the communicating member 13b may extend and incline in the oblique upward direction from the front plate 25c without being bent.

The sub-air-chamber member 13 having the above-explained structure is formed of a resin, and from the standpoint of weight saving, improvement of the productivity, reduction of the production cost, and securing of the air-tightness of the sub air chamber SC, a resin which is lightweight with high rigidity and which can be subjected to blow-molding is desirable. In particular, ABS or nylon is especially desirable.

<<Structure of Spacer>>

As shown in FIG. 2, the spacer 15 is disposed between adjoining sub-air-chamber members 13 disposed on the well-portion outer circumference surface 11i at equal intervals (with spaces). The spacer 15 has a length in the wheel circumferential direction X set to be substantially equal to the space between the main bodies 13a of respective sub-air-chamber members 13.

Figure 4A:
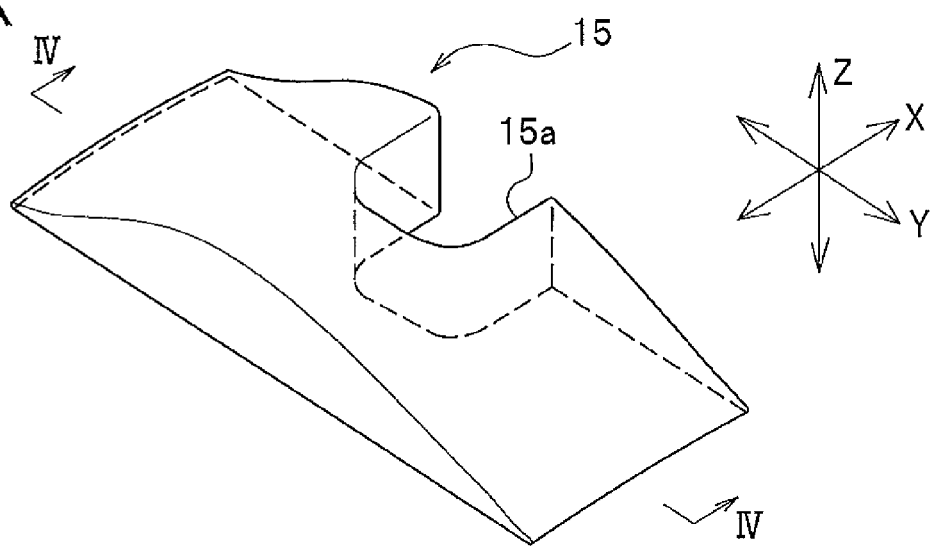
FIG. 4A is a perspective view of a spacer which is a member of the vehicle wheel of the embodiment.
Figure 4B:
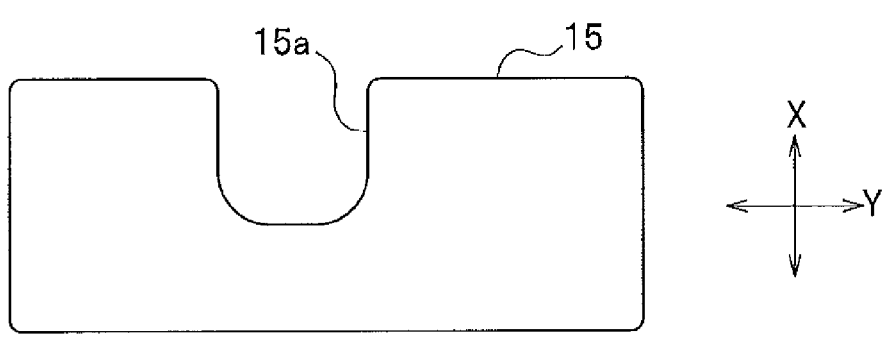
FIG. 4B is a plan view of the spacer.

As shown in FIGS. 4A and 4B, the spacer 15 is a solid block having a recess 15a at one-end side in the wheel circumferential direction X. Note that the spacer 15 may be hollow.

Figure 4C:
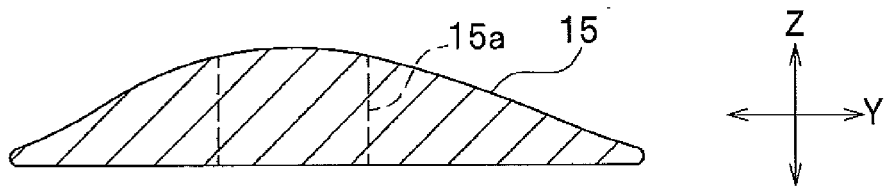
FIG. 4C is a cross-sectional view taken along a line IV-IV in FIG. 4A.

The spacer 15 is so formed that a total cross section including the cross section of the recess 15a, i.e., a total cross section in the rim width direction Y when no recess 15a would be present becomes uniform across the whole length in the wheel circumferential direction X. As shown in FIG. 4C, the total cross section of the spacer 15 in the rim width direction Y has an inner side (lower side of paper face of FIG. 4C) of the wheel diameter direction Z which is flat along the rim width direction Y, and has an outer side (upper side of paper face of FIG. 4C) of the wheel diameter direction Z which is curved so as to be convex. More specifically, the total cross section of the spacer 15 shown in FIG. 4C is formed so as to be the same as the shape of the total cross section of the sub-air-chamber member 13 (see FIG. 3C) explained above.

As shown in FIGS. 4A and 4B, the recess 15a is notched in a substantially U shape as viewed from a top so as to pass all the way through in the height direction of the spacer 15 (wheel diameter direction Z).

Figure 4D:
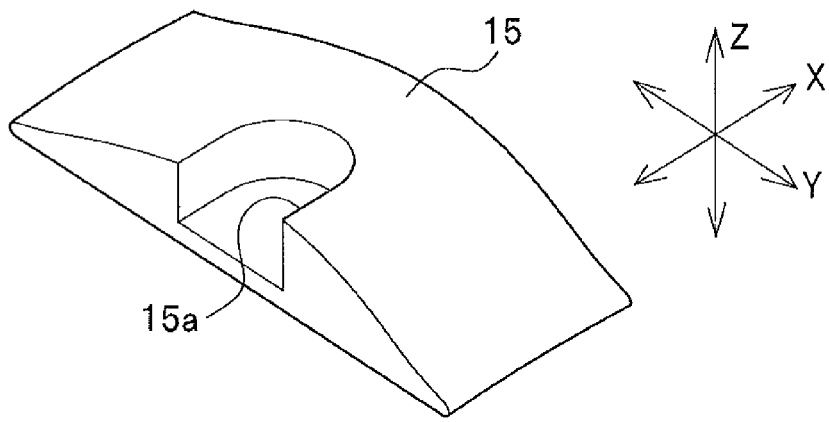
FIG. 4D is a perspective view of a modified example of the spacer.

As will be discussed later, when the spacer 15 is disposed between adjoining sub-air-chamber members 13 (see FIG. 5), the recess 15a houses the communicating member 13b protruding in the longitudinal direction of the sub-air-chamber member 13, and allows the opening of the communicating member 13b to reach the inside of the tire air chamber MC (see FIG. 1B). That is, as far as the recess 15a is formed at one end side of the spacer 15 in the wheel circumferential direction X and is formed on a face on the side of the cover 14 (see FIG. 1A) which covers the spacer 15, the shape of the recess 15a is not limited to any particular one. Accordingly, the recess 15a may not be formed so as to pass all the way through in the height direction of the spacer 15, and for example, as shown in FIG. 4D, the recess 15a may have a bottom face at a side inwardly of the wheel diameter direction Z.

The spacer 15 as explained above can be made of a resin, a synthetic rubber, etc.

<<Structure of Cover>>

The cover 14 is made of a rubber, and as shown in FIGS. 1A and 1B, is an annular band disposed across the whole outer circumference surface of the rim 11. The cover 14 is disposed so as to cover the sub-air-chamber members 13 and the spacers 15 fixed on the well-portion outer circumference surface 11i, and is disposed from the margins R of the well portion 11c onto which the bead parts 21a, 21a are fallen to rising portions 11f formed from respective margins R to respective hump portions 11e.

The cover 14 that covers the sub-air-chamber members 13, the spacers 15, and the margins R of the well portion 11c can have a thickness set to be substantially uniform accordingly. It is desirable to set such a thickness to be equal to or less than 5 mm, more desirably, be equal to or less than 3 mm or so. The thickness of the cover 14 which covers the rising portion 11f gradually decreases toward the hump portion 11e (toward the end in the rim width direction Y), and the thickness of the end edge of the cover 14 reaching the hump portion 11e is set to be the thinnest. Meanwhile, the thickness of such an end edge in this embodiment is set to 0.5 mm.

The cover 14 is bonded to the rim outer circumference surface 11d with adhesive (not shown). That is, between the cover 14 and each of the rising portion 11f of the rim 11, the well portion 11c (the margin R) thereof, the sub-air-chamber member 13, and the spacer 15, the adhesive (not shown) is present. An appropriate example of such an adhesive is an epoxy-resin-based bond.

Note that, in the present embodiment, the cover 14 is formed in a shape prior to bonding to the rim 11 which is a shape matching a profile of the rising portion 11f and that of the well portion 11c in a condition in which the sub-air-chamber members 13 and the spacers 15 are fixed thereon. However, the cover 14 of the present invention may be an annular band in a near shape having a reduced diameter than the diameters of the forgoing profiles. The annular band in a near shape can be tightly fitted and fixed to the rim 11 where the sub-air-chamber members 13 and the spacers 15 are fixed by the stretch property of such an annular band.

Also, the shape of the cover 14 before attached to the rim 11 may be a normal circular cylindrical shape.

As explained above, the cover 14 of this embodiment is fixed, by means of a adhesive, to the margins R of the well portion 11c and respective rising portions 11f at both sides of the sub-air-chamber member 13 and at both sides of the spacer 15 in the rim width direction Y. Also, as explained above, the cover 14 in a near shape having a reduced diameter than the diameter of the profile is also fixed to the rim 11 by a straining force (contraction force). Furthermore, the cover 14 disposed so as to cover the sub-air-chamber members 13 and the spacers 15 is also fixed to the rim 11 (the well portion 11c) via the sub-air-chamber members 13 and the spacers 15.

As shown in FIGS. 1A and 2, the cover 14 as explained above has openings 14a at positions corresponding to positions of respective recesses 15a (see FIG. 2) of the spacers 15. The opening 14a allows the communicating member 13b (see FIG. 3A) of the sub-air-chamber member 13 to reach the inside of the tire air chamber MC (see FIG. 1B), and is formed in the same planar shape as the planar shape of the recess 15a (see FIG. 4B) of the spacer 15.

A material of the cover 14 is a rubber in this embodiment.

Examples of such a rubber component are a natural rubber (NR), a butadiene rubber (BR), a styrene-butadiene rubber (SBR), an isoprene rubber (IR), a butyl rubber (IIR), and an ethylene-propylene rubber (EPDM). In particular, the butyl rubber (IIR) and the ethylene-propylene rubber (EPDM) which are heat-insulation rubbers are desirable from the standpoint of reducing the rolling resistance of the tire 20 (see FIG. 1B) as will be discussed later. It is needless to say that a compounding agent normally used in rubber industries, such as a strengthening agent like carbon black, a vulcanizing agent, a vulcanizing auxiliary agent, a vulcanizing promoter, an aging inhibitor, and a flexibilizer, can be blended with such a rubber component as needed.

Also, it is more desirable that such a rubber component should be one containing a heat-insulating filler or a foam rubber. Desirable examples of such heat-insulating filler are:

scotch light glass bubbles series (made by 3M) mainly composed of borosilicate Na; CenoSpheres (made by Ashtek) and Cenolite (made by Tomoe Engineering Co., Ltd.) mainly composed of silica and alumina; and inorganic hollow particles such as shirasu balloons or Winlite (made by Axyz Chemical).

Examples of such a foam rubber are ones having non-successive gas bubbles (isolatedgas bubbles) or substantially successive gas bubbles formed by causing a foaming agent contained in an unvulcanized rubber to foam at the time of vulcanization. In particular, a foam rubber with non-successive foams is superior in the heat-insulation property, and as explained above, is desirable as the rolling resistance of the tire 20 (see FIG. 1B) can be further reduced.

Examples of such foaming agent are N,N'-dinitrosopentamethylenetetramine (DNPT), azodicarbonamide (ADCA), dinitrosopentastyrenetetramine, benzenesulphonylhydrazide derivative, oxybisbenzenesulphonylhydrazide (OBSH), ammonium acid carbonate, sodium hydrogen carbonate, ammonium carbonate, nitrososulfonylazo compound, N,N'-dimethyl-N,N'-dinitrosophthalamide, toluenesulphonylhydrazide, p-toluenesulphonylsemicarbazide, and p,p'-oxybis (benzenesulphonylsemicarbazide).

Note that the combination amount of such a heat-insulating filler or of such foaming agent relative to the rubber component can be set accordingly within a range normally carried out in rubber industries.

<<Method of Manufacturing Vehicle Wheel>>

The vehicle wheel 10 of this embodiment is manufactured through a step of fixing a rubber member 16 (see FIG. 1B) on the outer circumference surface of the well portion 11c, a step of fixing the sub-air-chamber members 13 and the spacers 15 on the rubber member 16, and a step of disposing the cover 14 so as to cover the sub-air-chamber members 13 and the spacers 15 on the well portion 11c, and a step of fixing the cover 14 to the rim outer circumference surface 11d (see FIG. 1B).

In the step of fixing the rubber member 16, first, a degreasing process is performed on the surface of the well portion 11c. An appropriate example of the degreasing process is an alkaline degreasing process which uses both alkaline components and a surface acting agent together. Next, an adhesive (not shown) is applied on the well portion 11c to paste the rubber member 16 thereon.

An appropriate example of the adhesive is an epoxy-resin-based bond.

As the rubber member 16 is present between the outer circumference surface of the well portion 11c and respective sub-air-chamber members 13, the rubber member 16 eliminates a difference in thermal expansion coefficient between the sub-air-chamber member 13 and the well portion 11c (the rim 11). That is, the rubber member 16 improves fixing force of the sub-air-chamber member 13 to the well portion 11c (the rim 11).

As shown in FIG. 1B, the rubber member 16 of this embodiment is an annular band having a substantially same width as the width of the sub-air-chamber member 13 in the rim width direction Y, and having a slightly shorter diameter than the diameter of the well portion 11c. The rubber member 16 is fitted onto the well-portion outer circumference surface 11i where the adhesive is applied and is fixed thereon. The thickness of the rubber member 16 can be set accordingly within a range where a difference in thermal expansion coefficient can be eliminated. In this embodiment, such a thickness is set to 0.5 mm.

The material of the rubber member 16 is not limited to any particular one, and for example, a natural rubber (NR), a butadiene rubber (BR), a styrenebutadiene rubber (SBR), an isoprene rubber (IR), a butyl rubber (IIR), or an ethylene-propylene rubber (EPDM) can be used appropriately.

Thereafter, by letting the adhesive which is pasting the rubber member 16 to be dried, this step completes.

Note that as explained above, the margins R of the well-portion outer circumference surface 11i where the bead parts 21a, 21a (see FIG. 1B) are fallen are secured at both ends of the sub-air-chamber member 13 and the spacer 15.

Next, in the step of fixing the sub-air-chamber members 13 and the spacers 15, as shown in FIG. 5, the foregoing adhesive (not shown) is applied on the rubber member 16, and the sub-air-chamber members 13 and the spacers 15 are disposed thereon and are bonded thereon by pressure. A bladder of a tire shaping apparatus can be appropriately used for pressure bonding. Thereafter, by letting the adhesive to be dried, this step completes.

The sub-air-chamber members 13 and spacers 15 fixed on the well-portion outer circumference surface 11i in this fashion have the total cross section, defined by the rim width direction and a radial direction, of the main body 13a of the sub-air-chamber member 13 and the total cross section, defined by the rim width direction and the radial direction, of the spacer 15 which have the same shape, and the communicating member 13b extending in the wheel circumferential direction X from the main body 13a is housed in the recess 15a of the spacer 15. Accordingly, the sub-air-chamber members 13 and the spacers 15 are successive across the whole circumference of the wheel in having same total cross sections defined by the rim width and radial directions.

Also, as explained above, the main body 13a of the sub-air-chamber member 13 has both ends whose inclination gradually becomes low so as to be thinner toward both ends of the rim width direction Y, so that the rising from respective margins R of the well portion 11c (see FIG. 1B) to both ends of the main body 13a is low. Also, as explained above, regarding the spacer 15 having the same total cross section as that of the main body 13a in the rim width direction Y, the inclination becomes low.

Next, in the step of fixing the cover 14, the foregoing adhesive is applied on, at least the rising portions 11f of the rim 11, the well portion 11c (including the margins R) thereof, the sub-air-chamber members 13, and the spacers 15, and the cover 14 (see FIG. 1A) is bonded thereon by pressure. The above-explained bladder can be appropriately used for pressure bonding. Thereafter, by letting the adhesive to be dried, this step completes.

As explained above, according to the vehicle wheel 10 manufactured through the foregoing steps, the sub-air-chamber members 13 and the spacers 15 both fixed on the well-portion outer circumference surface 11i are covered by the cover 14 (see FIG. 1A) from the external side, and the cover 14 is fixed on the outer circumference surface of the rim 11 at both sides of each sub-air-chamber member 13 and both sides of each spacer 15.

Next, an explanation will now be given of an operation of the vehicle wheel 10 of this embodiment.

According to the vehicle wheel 10 of this embodiment, when the fixing member between the sub-air-chamber member 13 and the well portion 11c becomes defective, e.g., when adhesive force of the sub-air-chamber member 13 relative to the well-portion outer circumference surface 11i becomes weak, the cover 14 covering the sub-air-chamber member 13 from the external side can prevent the sub-air-chamber member 13 from being detached from the well-portion outer circumference surface 11i.

Moreover, because the sub-air-chamber member 13 and the spacer 15 are fixed on the well-portion outer circumference surface 11*i* by the adhesive and by the cover 14, the vehicle wheel 10 can further improve the durability at the time of fast-speed rotation.

Also, according to the vehicle wheel 10, because the cover 14 suppresses an heat transfer from the tire air chamber MC to the rim 11, temperature decrease in the tire air chamber MC is prevented, and the temperature of the tread part of the tire 20 is maintained at high. Accordingly, the rolling resistance of the tire 20 is reduced, thereby improving the fuel economy. In particular, according to the vehicle wheel 10 having the cover 14 formed of a heat-insulation rubber, the heat transfer from the tire air chamber MC to the rim 11 is further suppressed, so that an effect of improving the fuel economy originating from reduction of the rolling resistance of the tire 20 can be further enhanced.

It is confirmed by the inventors of the present invention through a simulation test that the vehicle wheel 10 having the cover 14 (thickness: 2 mm) formed of a foam rubber with butyl rubber increases the temperature of the tire air chamber MC by 2 to 3° C. when a vehicle travels in comparison with a vehicle wheel having no cover 14, and also improves the fuel economy by 1% in an LA-4 mode (an urban zone running mode of U.S. automotive fuel economy test).

Also, according to the vehicle wheel 10, the rubber member 16 is fixed on the well-portion outer circumference surface 11*i*, and the sub-air-chamber member 13 and the spacer 15 are both fixed on the rubber member 16. As a result, according to the vehicle wheel 10, like a case in which the sub-air-chamber member 13 is made of a resin and the rim 11 is made of a metal, when respective thermal expansion coefficients differ from each other, because the intervening rubber member 16 eliminates such a difference in the thermal expansion coefficient, the sub-air-chamber member 13 is further surely fixed on the rim 11.

Also, according to the vehicle wheel 10, the sub-air-chamber member 13 is so formed as to have the same total cross section in the rim width direction Y across the whole length in the wheel circumferential direction X, and the spacer 15 having the same total cross section as that of the sub-air-chamber member 13 is disposed between adjoining sub-air-chamber members 13. As a result, according to the vehicle wheel 10, because the total cross section of the sub-air-chamber 13 and that of the spacer 15 in the rim width direction Y remain same in the whole wheel circumferential direction, attachment of the cover 14 and tight fixing thereof are facilitated.

Also, according to the vehicle wheel 10, the main body 13*a* of the sub-air-chamber member 13 and the spacer 15 are so formed as to have an inclination that gradually becomes gentle toward both ends in the rim width direction Y and such both ends are each in a thin and flat shape. As a result, according to the vehicle wheel 10, attachment of the cover 14 and tight fixing thereof are facilitated.

Figure 6:
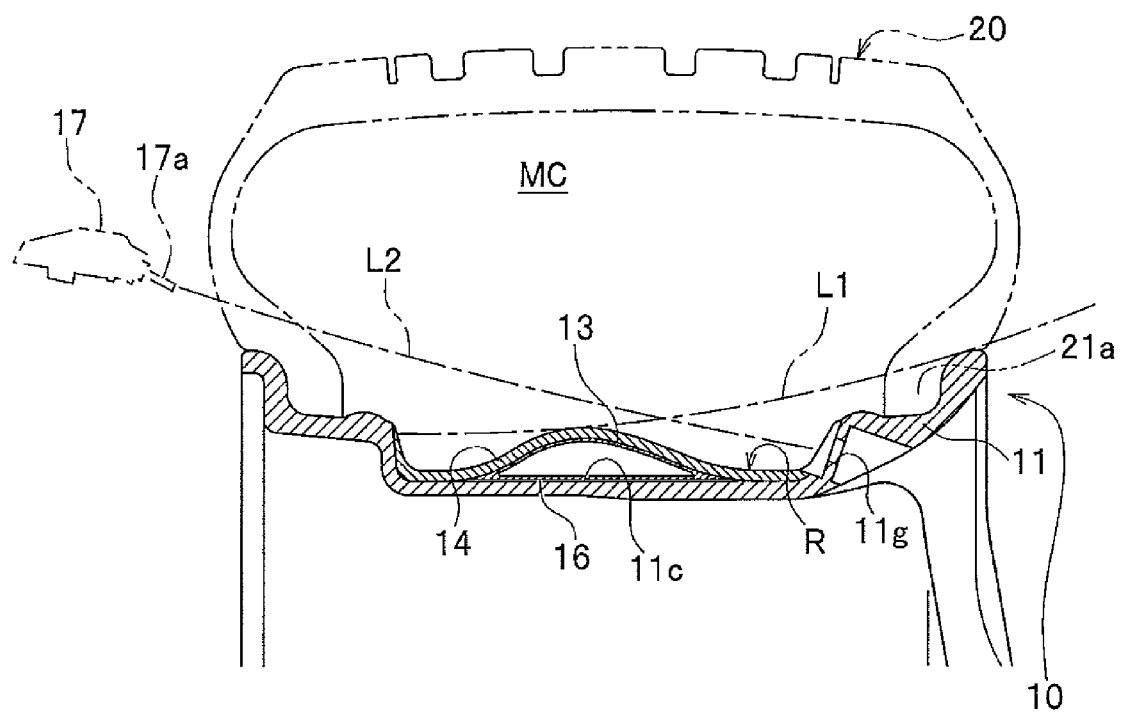
FIG. 6 is a conceptual diagram showing a movement trajectory of a tire changer (lever) and that of the air pressure detecting device when a tire is removed from and attached to and the air pressure detecting device is attached to the vehicle wheel of the embodiment.

As explained above, because the main body 13*a* of the sub-air-chamber member 13 and the spacer 15 are both formed in a flat shape, according to the vehicle wheel 10, at the time of a tire removal and attachment operation by a tire changer or of an attachment work of the air pressure detecting device 17 to the rim 11, no interference with the sub-air-chamber member 13 or with the spacer 15 occurs. FIG. 6 is a conceptual diagram showing a movement trajectory of a tire changer (lever) and that of the air pressure detecting device when a tire and the air pressure detecting device are removed and attached to the vehicle wheel of this embodiment.

As shown in FIG. 6, in a tire removal and attachment to the vehicle wheel 10, when respective bead parts 21*a* of the tire 20 are fallen onto respective margins R of the well portion 11*c*, a movement trajectory L1 of the leading end of the tire changer (lever) is located above the sub-air-chamber member 13 in a flat shape.

Also, as shown in FIG. 6, in an attachment step of the air pressure detecting device 17 to the vehicle wheel 10, the movement trajectory L2 of the air pressure detecting device 17 when the tire-valve portion 17*a* of the air pressure detecting device 17 is inserted and fixed in the attachment hole 11*g* formed in the rim 11 is located above the sub-air-chamber member 13 formed in a flat shape.

Also, according to the vehicle wheel 10, because the sub-air-chamber member 13 is covered by the cover 14, it is possible to prevent the sub-air-chamber member 13 from being damaged during a detachment operation of a tire.

Also, according to the vehicle wheel 10, because the thickness of an end edge of the cover 14 reaching the hump portion 11*e* shown in FIG. 1B is thin, when the bead part 21*a* of the tire 20 is fallen onto the well portion 11*c* (the margin R), it is possible to prevent the bead part 21*a* from catching the end edge of the cover 14. Accordingly, the workability of a tire removal and attachment work improves, and it is possible to prevent the cover 14 from being peeled or damaged.

Also, according to the vehicle wheel 10, the communicating member 13*b* is disposed in the recess 15*a* of the spacer 15. Accordingly, the spacer 15 can be efficiently used as a location where the communicating member 13*b* protruding from the sub-air-chamber member 13 is retained. Also, because the communicating member 13*b* retained in the recess 15*a* is surrounded by the spacer 15, according to the vehicle wheel 10, it is possible to prevent the communicating member 13*b* from being damaged during a tire detachment work.

Also, according to the vehicle wheel 10, because the spacer 15 is disposed between adjoining sub-air-chamber members 13, positioning of the plural sub-air-chamber members 13 on the well portion 11*c* when those members are disposed thereon is facilitated. When the fixing member between each sub-air-chamber member 13 and the well portion 11*c* becomes defective, e.g., when the adhesive force of the sub-air-chamber member 13 to the well-portion outer circumference surface 11*i* becomes weak, because the spacer 15 is disposed between adjoining sub-air-chamber members 13, the clearance between adjoining sub-air-chamber members 13 is maintained and any misalignment thereof can be surely suppressed.

The embodiment of the present invention was explained, but the present invention is not limited to the foregoing embodiment, and can be changed and modified in various forms. In a vehicle wheel according to the other embodiments discussed below, the same structural element as that of the foregoing embodiment will be denoted by the same reference numeral, and the detailed explanation will be omitted.

Figure 7A:
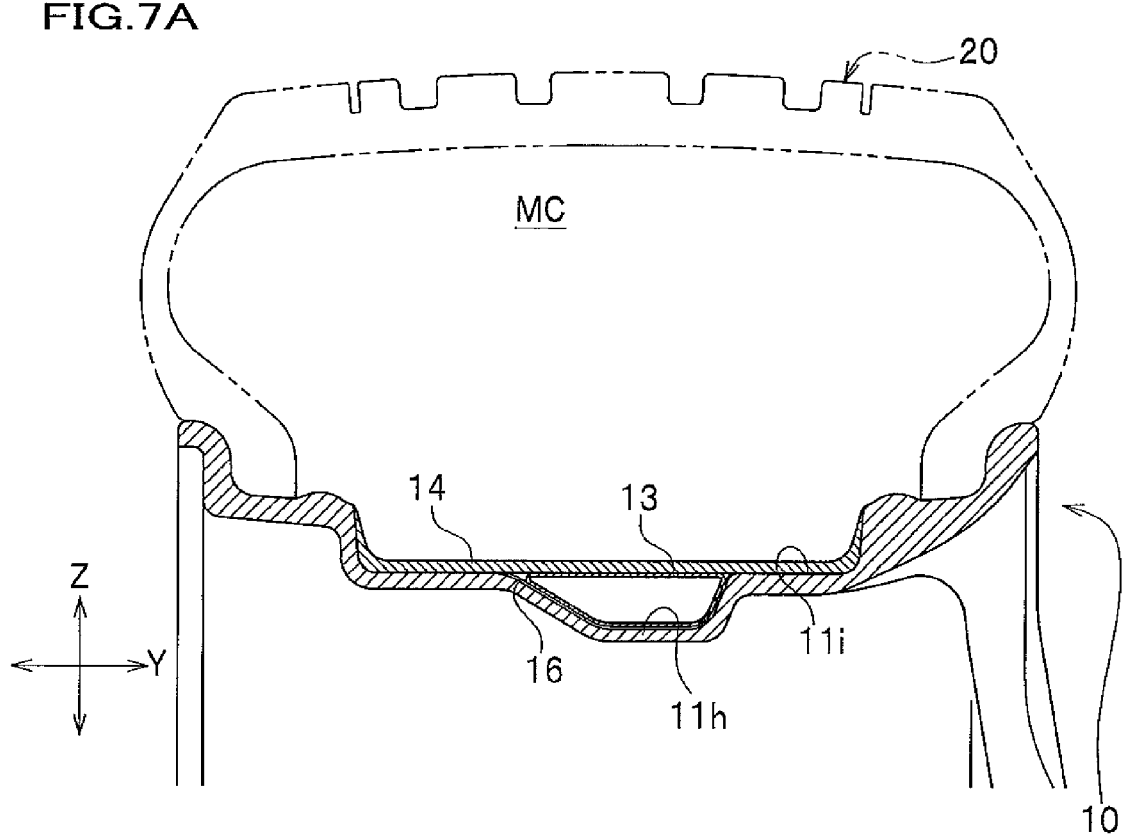
FIG. 7A is a partial cross-sectional view of the vehicle wheel having a well portion where a recess for retaining the sub-air-chamber member is formed.
Figure 7B:
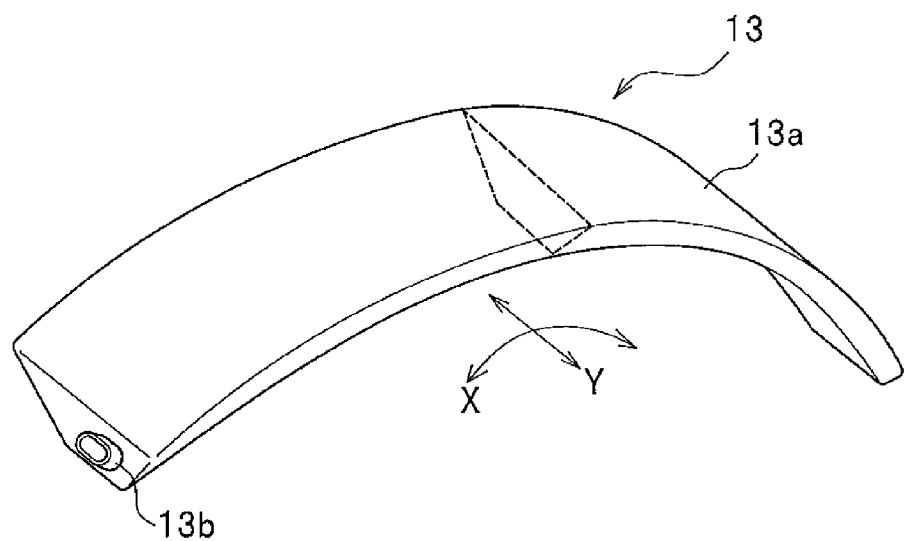
FIG. 7B is a perspective view showing the sub-air-chamber member disposed in the recess shown in FIG. 7A.
Figure 8:
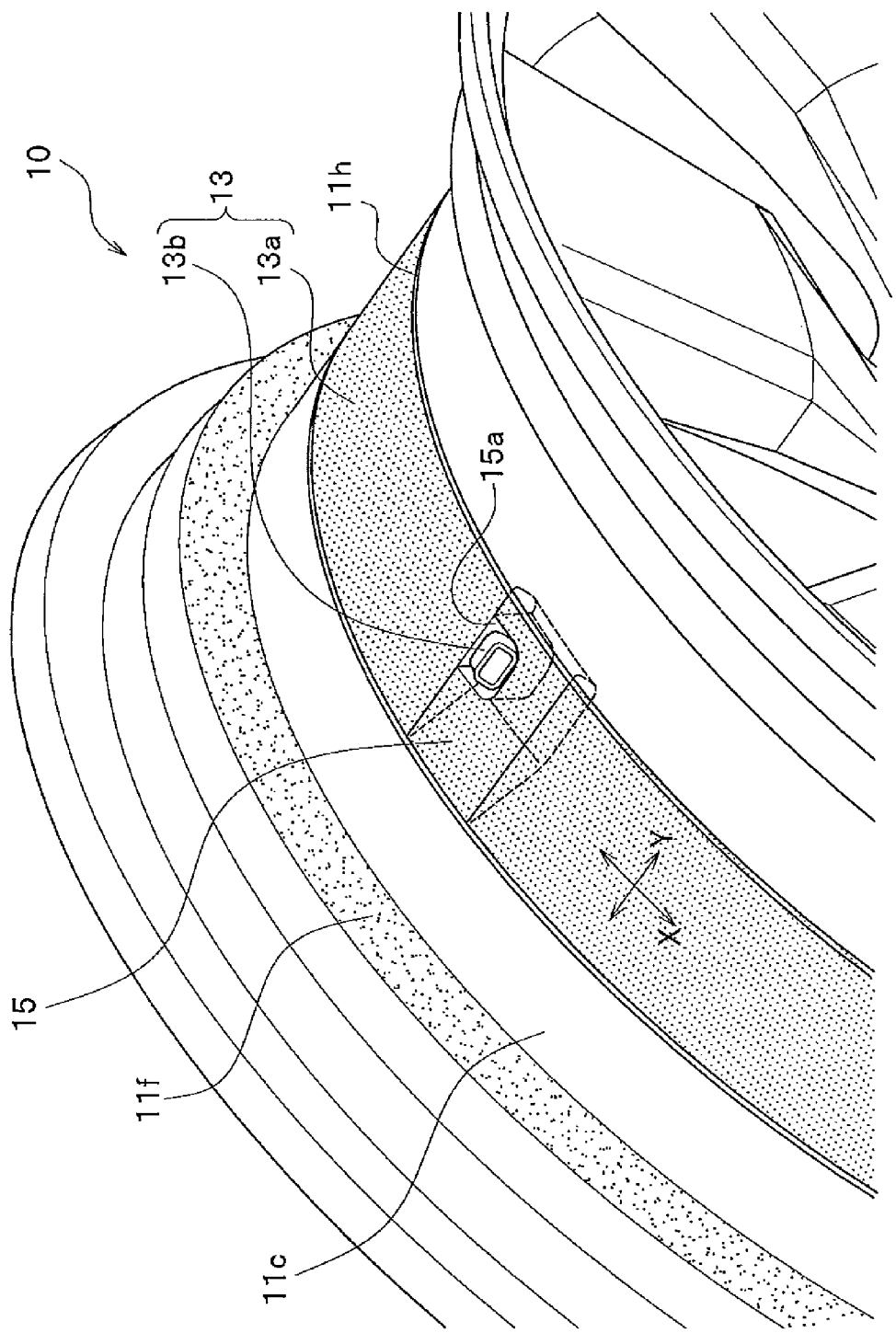
FIG. 8 is a partial enlarged perspective view showing a status of the sub-air-chamber member and the spacer fixed on the well portion in the vehicle wheel having the well portion where the recess is formed.

In the foregoing embodiment, the well portion 11*c* is formed in a cylindrical shape having a substantially uniform diameter across the rim width direction Y, but the present invention may have a well portion 11*c* formed with a recess retaining at least the sub-air-chamber member 13 along the wheel circumferential direction X. FIG. 7A is a partial cross-sectional view of a vehicle wheel having a well portion formed with a recess that retains a sub-air-chamber member, and FIG. 7B is a perspective view of the sub-air-chamber member retained in the recess in FIG. 7A. FIG. 8 is a partial enlarged perspective view showing how the sub-air-chamber member and a spacer are fixed on the well portion.

As shown in FIG. 7A, the vehicle wheel 10 has a recess 11*h* formed in the outer circumference surface of the well portion 11*c* (well-portion outer circumference surface 11*i*), and has the sub-air-chamber member 13 retained in the recess 11*h*.

As shown in FIG. 7B, the sub-air-chamber member 13 is so formed that a total cross section of the main body 13a in the rim width direction Y becomes substantially the same as the total cross section of the recess 11h shown in FIG. 7A in the rim width direction Y, but other features are the same as those of the sub-air-chamber member 13 in the foregoing embodiment.

In FIG. 7A, a symbol Y indicates a rim width direction, and a symbol Z indicates a wheel diameter direction. In FIG. 7B, a symbol X indicates a wheel circumferential direction, and a symbol Y indicates the rim width direction.

As shown in FIG. 8, the spacer 15 is so formed as to have a total cross section in the rim width direction Y substantially the same as the total cross section of the main body 13a of the sub-air-chamber member 13.

As shown in FIG. 8, according to the vehicle wheel 10, an upper part of the main body 13a and that of the spacer 15 both retained in the recess 11h form a flat plane successive from the well-portion outer circumference surface 11i adjacent to the recess 11h. In FIG. 8, reference numeral 11c denotes the well portion, a reference numeral 11f denotes a rising portion, reference numeral 13a denotes the main body of the sub-air-chamber member, a reference numeral 13b denotes a communicating member of the sub-air-chamber member 13, and a reference numeral 15a denotes a recess of the spacer 15.

Therefore, according to the vehicle wheel 10, because the upper part of the sub-air-chamber member 13 (the main body 13a) and the well-portion outer circumference surface 11i adjacent to the recess 11h form a successive plane, attachment of the cover 14 (see FIG. 7A) and tight fixing thereof are facilitated. In other words, the upper part of the sub-air-chamber member 13 (the main body 13a) is flush with the well-portion outer circumference surface 11i adjacent to the recess 11h.

Also, according to the vehicle wheel 10, the sub-air-chamber member 13 does not protrude outwardly of the wheel diameter direction Z (see FIG. 7A). It is possible to prevent the sub-air-chamber member 13 from being damaged during a tire removal and attachment work.

Also, because the communicating member 13b (see FIG. 8) of the sub-air-chamber member 13 can be caused to protrude from the main body 13a in the wheel circumferential direction X within the recess 11h, it is possible to prevent the communicating member 13b from being damaged during a tire removal and attachment work.

As shown in FIG. 8, the vehicle wheel 10 has the spacer 15 disposed between adjoining sub-air-chamber members 13, but the present invention is not limited to this structure, and the recess 11h may be formed in a shape that retains only the sub-air-chamber members 13, and the spacer 15 may be omitted. According to such a vehicle wheel 10, the well portion 11c present between adjoining sub-air-chamber members 13, i.e., a metal part itself forming the well portion 11c functions as the spacer 15.

Figure 9:
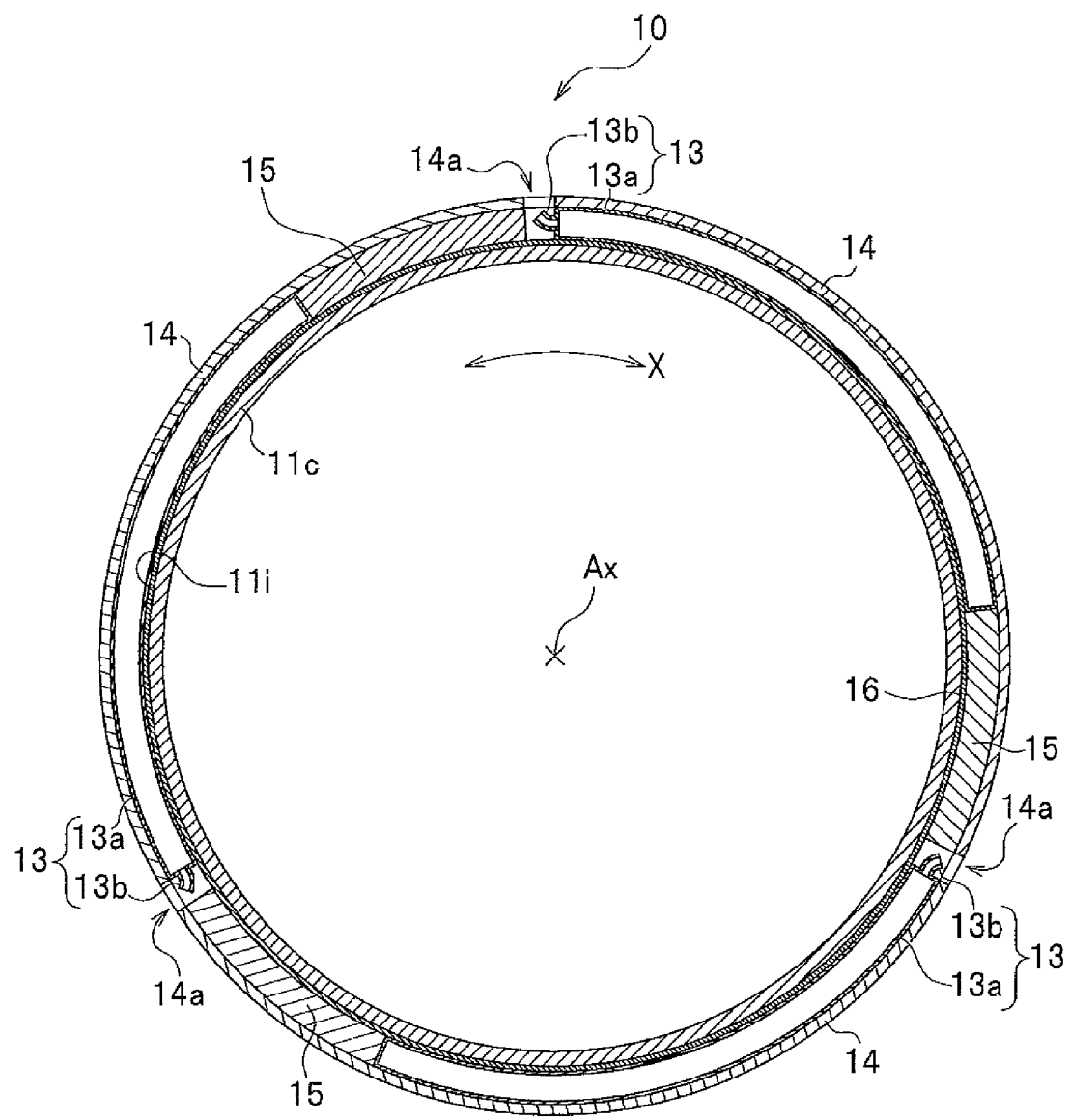
FIG. 9 is a cross-sectional view of a vehicle wheel according to another embodiment to show a modified example relating to arrangement of the sub-air-chamber member.

In the foregoing embodiment, the four sub-air-chamber members 13 are disposed at equal intervals along the circumferential surface of the well portion 11c, but the number of the sub-air-chamber members 13 may be equal to or larger than five, or be equal to or less than three according to the present invention. FIG. 9 is a side cross-sectional view showing a vehicle wheel according to another embodiment, and is a diagram showing a modified example of arrangement of respective sub-air-chamber members.

A vehicle wheel 10 shown in FIG. 9 has three sub-air-chamber members 13 at equal intervals along the circumferential surface of the well portion 11c.

A spacer 15 of the modified example is the same as the spacer 15 of the foregoing embodiment except that such a spacer 15 elongates in the wheel circumferential direction X in accordance with a clearance between adjoining sub-air-chamber members 13.

Note that in FIG. 9, reference numeral 14a denotes an opening of the cover 14, and a symbol Ax is a wheel rotational axis.

As explained above, according to the vehicle wheel 10, the number of the sub-air-chamber members 13 is not limited to any particular number, but from the standpoint of silencing effect, it is desirable that equal to or more than four (equal to or more than two pairs of) sub-air-chamber members 13 should be disposed so that a pair faces another pair across the wheel rotational axis Ax. From the standpoint of weight reduction of the vehicle wheel 10 and improvement of the productivity thereof, it is desirable that two to four sub-air-chamber members 13 should be disposed at equal intervals along the circumferential surface of the well portion 11c.

What is claimed is:

1. A vehicle wheel comprising:
    a rim including a well portion, the rim configured to have a tire attached thereto;
    a sub-air-chamber member that reduces air column resonance of the tire and disposed on an outer circumference surface of the well portion, wherein the sub-air-chamber member is fixed on the well-portion outer circumference surface; and a cover provided distinctly from the tire, made of a rubber covering the sub-air-chamber member from an external side, is fixed on an outer circumference surface of the rim at both sides of the sub-air-chamber member in a rim width direction.

2. The vehicle wheel according to claim 1, wherein the cover is formed of a heat-insulation rubber.

3. The vehicle wheel according to claim 1, wherein a rubber member is fixed on the well-portion outer circumference surface of the rim, and the sub-air-chamber member is fixed on the rubber member.

4. The vehicle wheel according to claim 1, wherein the well portion comprises a recess formed in the well-portion outer circumference surface to houses the sub-air-chamber member, and an upper part of the sub-air-chamber member is flush with the well-portion outer circumference surface adjacent to the recess.

5. The vehicle wheel according to claim 1, wherein the sub-air-chamber member comprises a plurality of sub-air-chamber members that are arranged in a circumferential direction of the rim with a space between adjoining sub-air-chamber members and fixed to the well-portion outer circumference surface, each sub-air-chamber member has the same cross section defined by the rim width direction and a radial direction of the vehicle wheel across a whole length of the sub-air-chamber member in a circumferential direction of the vehicle wheel, the vehicle wheel further comprises a spacer, having the same cross section defined by the rim width direction and the radial direction of the vehicle wheel as the cross section of the sub-air-chamber member, and fixed on the well-portion outer circumference surface between adjoining sub-air-chamber members to make the cross sections of the sub-air-chamber member and the spacer continuous across a whole circumference of the vehicle wheel, each sub-air-chamber member and each spacer are covered by the cover from an external side, and the cover is fixed on the outer circumference surface of the rim at both sides of each sub-air-chamber member and at both sides of each spacer in the rim width direction.

6. The vehicle wheel according to claim 5, wherein the spacer has a recess formed on a face on the cover side, the cover has an opening at the recess, and a communicating member that protrudes from the sub-air-chamber member and causes an inside of the sub-air-chamber member to communicate with a tire air chamber is disposed in the recess.

* * * * *